Sept. 2, 1958  H. H. RAUH  2,850,598
CONTROLLER
Filed March 7, 1957  2 Sheets-Sheet 1
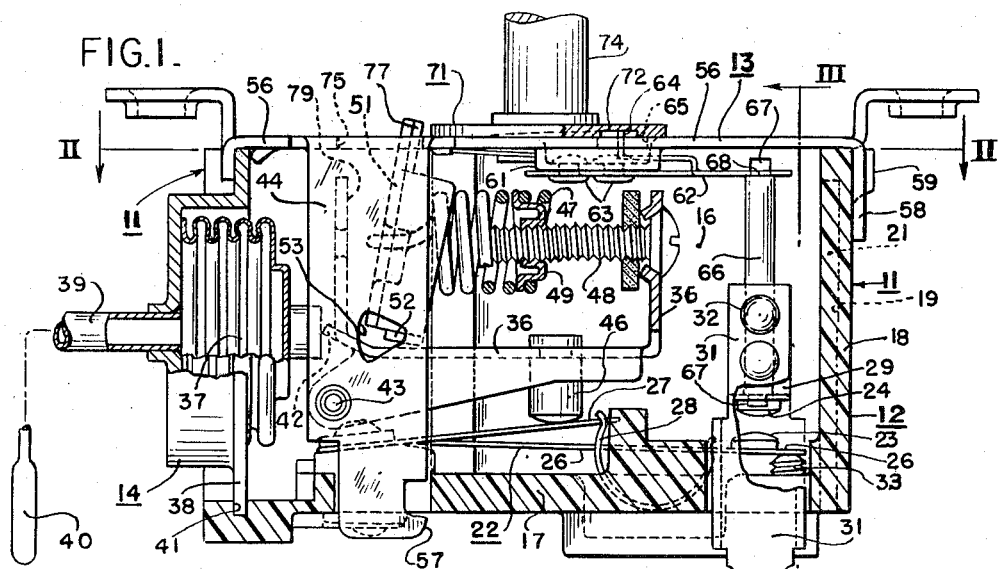
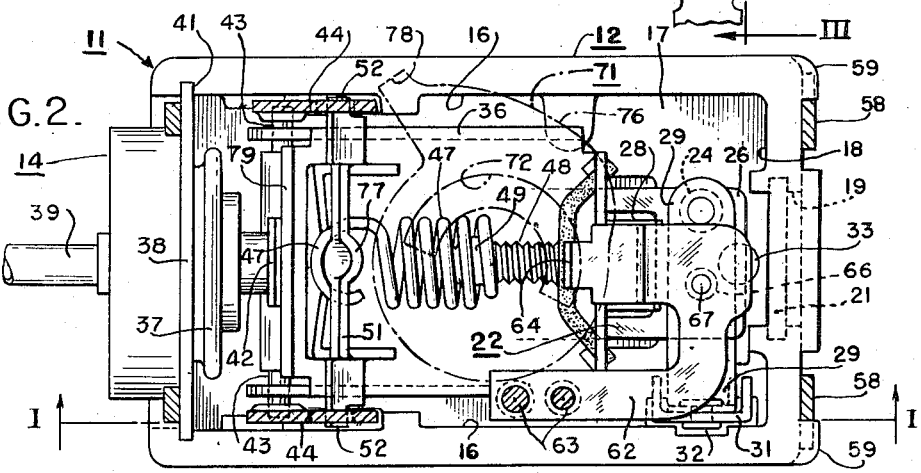
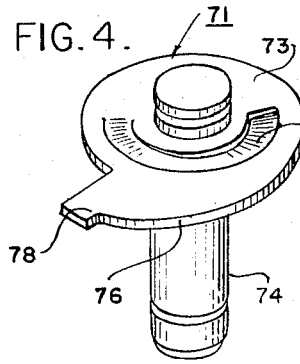
INVENTOR
HERBERT H. RAUH
BY
ATTORNEY Sept. 2, 1958
H. H. RAUH
2,850,598
CONTROLLER
Filed March 7, 1957
2 Sheets-Sheet 2
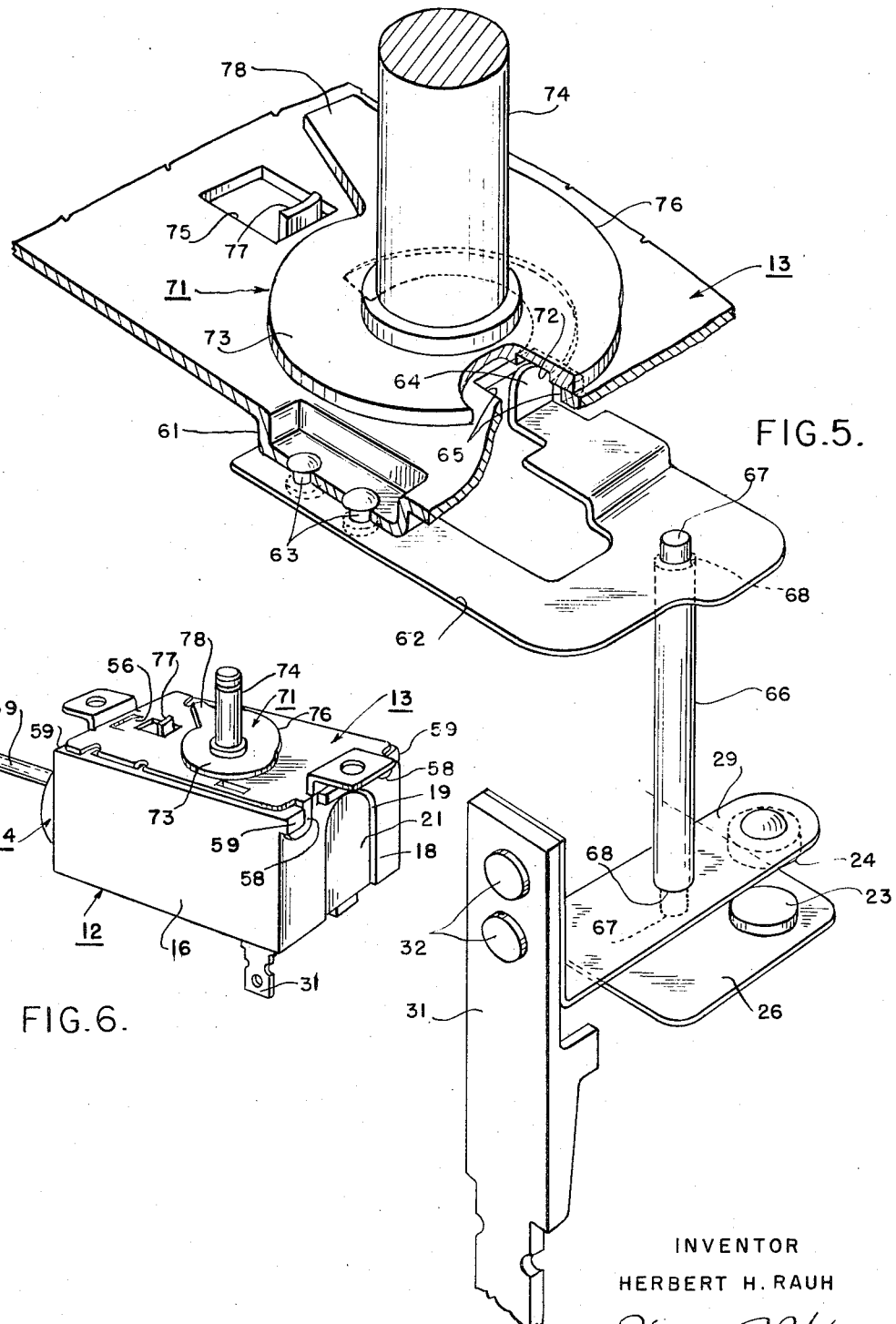
INVENTOR
HERBERT H. RAUH
BY *William J. Foley*
ATTORNEY United States Patent Office 2,850,598
Patented Sept. 2, 1958

2,850,598

CONTROLLER

Herbert H. Rauh, Columbus, Ohio, assignor to Westinghouse Electric Corporation, East Pittsburgh, Pa., a corporation of Pennsylvania Application March 7, 1957, Serial No. 644,585

6 Claims. (Cl. 200—140)

This invention relates to controllers and more particularly to condition responsive controllers of the type employed for temperature regulation in refrigerators or the like.

Certain refrigeration applications require a temperature-responsive circuit controller capable of energizing the refrigerating machinery upon sensing a first predetermined temperature and of deenergizing the refrigerating machinery at a second predetermined temperature lower than the first temperature and containing provisions for varying the temperature at which the controller effects deenergization without changing the temperature at which the controller effects energization. Controllers of this type are commonly referred to as "constant cut-in" controllers and are generally employed in domestic refrigerators wherein it is desirable to energize the refrigerating machinery only after the temperature of the cooling unit has risen to a predetermined value above the freezing point of water to permit the cooling unit to defrost during "off" periods of the refrigerating machinery. The deenergizing, or cut-out, temperature of this type of controller is preferably adjustable to enable the user to vary the average temperature maintained within the refrigerator by raising or lowering the temperature at which the refrigerating operation is terminated.

It is the principal object of this invention to provide an improved controller of the aforementioned type which may be easily and inexpensively manufactured and which will possess long life and reliability.

A feature of the invention is the novel mechanical linkage employed in the controller to adjust the cut-out temperature of the controller, i. e., the temperature at which the controller opens the circuit controlled thereby. The invention is applicable to controllers employing an electric switch actuated through a suitable mechanical linkage by a condition responsive device, and in which the cut-out temperature for the controller is varied by adjusting the position of the stationary contact of the switch mechanism. In accordance with this invention, this stationary contact is supported by a spring member which is connected by means of a pin to another spring member mounted on the inner surface of one wall of the controller casing and having a portion projecting through that wall of the controller casing in a postion to be engaged by the cam face of a rotatable member mounted on the outer surface of this casing wall. This arrangement, which will be described in greater detail hereinafter, is such that the rotatable member covers and protects the opening in the casing wall through which the second mentioned spring member projects. The components are also so arranged that they may be readily and easily assembled within the controller casing.

Other objects, advantages and features of the invention will become apparent from the following detailed description of the invention in which reference is made to the accompanying drawing wherein:

Fig. 1 is a longitudinal section view through a controller constructed in accordance with this invention and in which certain portions are broken away to clarify the illustration;

Fig. 2. is a horizontal sectional view of the controller taken just beneath the cover portion of the casing as indicated generall by the line II—II in Fig. 1;

Fig. 3 is a vertical sectional view of the controller taken generally as indicated by the line III—III in Fig. 1;

Fig. 4 is a perspective view showing the under surface of a cam employed in the controller;

Fig. 5 is an enlarged fragmentary perspective view of the contact adjusting mechanism of the controller; and Fig. 6 is a perspective view on a reduced scale showing the exterior of the controller.

Referring to the drawings in detail, the invention is shown applied to a thermally responsive circuit controller, the principal components of which are housed within a casing indicated generally by the numeral 11 and comprising a housing 12 having open top and end wall portions which are closed, respectively, by a frame 13 and a condition responsive device 14. The housing 12 is preferably molded of electrical insulating material and possesses a pair of upstanding, substantially parallel side walls 16 connected by a bottom wall 17 and a right-hand end wall 18. The housing end wall 18 preferably has an opening 19 therein which is closed by a sliding plate 21 also made of electrically insulating material (see Fig. 6).

The lower wall 17 of the housing 12 has mounted thereon an electric switch mechanism 22 adapted to control the relative position of a pair of electrical contacts 23 and 24 (see Fig. 1). While this invention is not limited to any particular type of switch mechanism, the switch mechanism 22, chosen for purposes of illustration, is of the over-center, snap acting variety and comprises a pair of flexible arms 26 and 27 having a C-shaped compression spring 28 interposed therebetween in such a manner that when the actuating arm 27 is moved through the plane of the actuated arm 26 the latter will be rapidly moved with a snap action by the spring 28 to its opposite position. The actuated arm 26 carries at its end the movable contact 23 and is adapted to move this contact 23 from the "open" positions shown in Figs. 1 and 3 to a "closed" position in which it engages the relatively stationary contact 24. The stationary contact 24 is supported for adjustable movement toward or away from the movable contact 23 by means of a resilient spring arm 29 mounted in cantilever fashion to the upper end of a terminal member 31 carried by the housing lower wall 17. The arm 29 is preferably made of a resilient material having good electrical conducting properties, such as beryllium copper, and is riveted to the terminal member 31 as indicated at 32. Opening movement of the contact carrying switch arm 26 is limited by an adjustable screw 33 threadably received in the housing lower wall 17.

The switch mechanism 22 is actuated through an operating lever 36 by the condition responsive device 14 carried at the left-hand end of the controller casing 11. The condition responsive device 14 includes an expansible bellows 37 sealed to a mounting plate 38 and having its interior communicating with a tube 39 connected to a temperature control bulb 40. The bellows 37, tube 39 and the bulb 40 are charged with a volatile fluid and the bellows 37 expands and contracts with changes in vapor pressure of the fluid as determined by the temperature to which the control bulb is subjected, all of which is well understood in the art. The control device mounting plate 38 rests in a U-shaped channel 41 in the left-hand end of the control housing 12. The operating lever 36 has a projection 42 thereon in engagement with the end of the bellows 37 and, upon expansive and contractive movement of the bellows 37, is angularly moved about a pivot pin 43 which supports the lever 36 between a pair of depending legs 44 forming a part of the frame 13. The right-hand end of the operating lever 36 carries an insulating button 46 adapted to engage the actuating arm 27 of the switch mechanism 22. The actuating arm 27 of the switch mechanism 22 is inherently biased upwardly to follow the movement of the button 46.

The operating lever 36 is biased counterclockwise against the force of the bellows 37 by a spring 47 connected at one end to the operating lever 36 by means of a screw 48 and a nut 49 threaded into the spring convolutions, and attached at its other end to an arm 51 having trunnion-like projections 52 projecting through openings 53 provided therefor in the frame legs 44 for pivotally mounting the arm 51 on the legs 44.

The frame 13 has a bight portion, identified at 56, that forms the top wall of the controller casing 11 and is shaped in the manner of a cover for the housing 12. The arrangement of the components of the controller wherein the operating lever 36 and the arm 51 are pivotally carried between the legs 44 of the U-shaped frame 13 is described more fully and claimed in my copending application, Serial No. 633,337 filed January 9, 1957. The frame is securely locked in place on the housing 12 by means of bendable tabs 57 at the lower extremities of its legs 44 which project through openings provided therefor in the casing lower wall 17 and which are twisted to prevent their removal. The top wall 56 also has a pair of hook shaped ears 58 projecting from the right-hand end thereof that are bent down over projections 59 on the housing end wall 18 to additionally lock the frame 13 in place on the housing 12 (see Fig. 6).

In accordance with this invention and as best shown in Figs. 1, 3 and 5, the frame 13 is embossed downwardly in a central region of its top wall 56 to provide a mounting boss 61 for a generally U-shaped leaf spring 62. The leaf spring 62 extends generally parallel to the top wall 56 and has one leg thereof secured by suitable means, such as the rivet 63, to the boss 61. The other leg of the leaf spring 62 has its end portion 64 bent at right angles to the plane of the spring and projects through an opening 65 provided therefor in the top wall 56. The bight portion of the U-shaped spring 62 has an opening therein for receiving one end of an elongated rigid pin 66, the other end of which is received in a similar opening in the contact mounting spring 29 disposed directly beneath the opening in the leaf spring 62. The pin 66 has reduced diameter end portions 67 to provide annular shoulders 68 for engagement with the springs 29 and 62. The springs 62 and 29, in their relaxed or undeflected positions within the controller casing 13, are spaced apart a distance less than the distance between the shoulders 68 on the pin 66 in such a manner that when the pin 66 is assembled between these springs 62 and 29, it will be held in place with its end portions 67 projecting through the openings provided therefor in the springs 62 and 29, with no additional securing means being required. The pin 66 is adapted to be inserted through opening 19 in housing end wall 18 after the frame 13 has been assembled to the housing 12. The spring arms 29 and 62 may be easily spread apart to receive the pin 66 therebetween.

The top wall 56 of the frame 13 carries on the outer surface thereof a rotatable cam 71 having an arcuate, vertical rise cam surface 72 embossed in the lower face 73 thereof (see Fig. 4) which is disposed in face-to-face engagement with the frame top wall 56. The cam 71 is positioned on the wall 56 with the cam surface 72 thereof disposed over the opening 65, whereby the cam surface 72 is engaged by the end projection 64 on the leaf spring 62. The cam 71 can be rotated by means of a shaft 74 to which it is affixed for bringing different portions of its cam surface 72 above the spring projection 64 for changing the vertical position of the projection 64. The leaf spring 62 maintains its projection 64 in yielding engagement with cam surface 72 and is deflected vertically as the cam 71 is rotated. Movement of the leaf spring 62 is transmitted to the contact carrying spring 29 by means of pin 66, so that the vertical position of stationary contact 24 is changed as cam 71 is rotated.

The edge of cam 71 also preferably possesses a cam configuration in an arcuate region thereof indicated at 76 for engaging and moving a projecting portion 77 of arm 51 which projects through another opening 75 in the frame top wall 56. The cam 71 is constructed in such a manner that through a substantial portion of its rotating movement, and during which movement its cam surface 72 is over the frame opening 65, its periphery is out of engagement with the projection 77 on arm 51. The cam shaped edge portion 76 of the cam 71 is, however, brought into contact with the arm 51 by an extreme movement of the cam 71 (clockwise for the cam shown in Figs. 2, 5 and 6) just before a projection 78 on the cam 71 engages the projection 77 on arm 51 and forms a stop for the cam 71. When moved to this extreme position, the cam 71 produces a positive "off" condition within the controller in which arm 51 is pivoted (counterclockwise as viewed in Fig. 1) into engagement with an upstanding arm portion 79 of the operating lever 36 in such a manner that the lever 36 is held in a position whereby switch mechanism 22 is permitted to separate contacts 23 and 24 regardless of pressure fluctuations within the bellows 37. When the cam 71 is in any position other than that previously described and producing the "off" condition of the controller, the arm 51 is out of contact with the cam 71 and maintained in a stationary position by virtue of its projection 77 engaging the edge of the opening 75 in the frame bight 56.

*Operation*

The controller operates in the following manner: Pressure changes within the bellows 37, occasioned by temperature changes of the fluid therein, cause the bellows 37 to expand and contract and move the operating lever 36 about its pivot pin 43 against the action of the spring 47. If the pressure within the bellows 37 is sufficient to overcome the force of spring 47, the right-hand end of the operating lever 36 moves downwardly, forcing the switch actuating arm 27 through the plane of the contact carrying arm 26 and thereby causing the contact carrying arm 26 to move upwardly, bringing contacts 23 and 24 into engagement. The pressure within the bellows 37 required to snap the switch mechanism 22 to its closed position corresponds to a predetermined fixed temperature to which the controller is responsive and which is known as the "cut-in" temperature for the controller. With a reduction in the temperature to which the controller is responsive, the fluid pressure within bellows 37 decreases, allowing the spring 47 to move the operating lever 36 counterclockwise. The operating lever 36 eventually reaches a position in which the switch actuating arm 27 again passes through the plane of the contact carrying arm 26 and the contacts 23 and 24 are separated with a snap-like motion. This condition is achieved when the controller senses its "cut-out" temperature.

Assuming the contacts 23 and 24 are closed and the switch arms 26 and 27 occupy reversed positions from those shown in Fig. 1, the point in the range of movement of the actuating arm 27 at which the arm 27 passes through the plane of the contact carrying arm 26 is determined by the position that the contact carrying arm 26 occupies. Since the stationary contact 24 acts as a stop for the contact carrying arm 26, the position in space of the contact 24 governs the position of the arm 26 while the contacts 23 and 24 are closed. If the position of contact 24 is changed upwardly, the arm 26 will assume a higher position. Conversely, if the stationary contact 24 is lowered, the arm 26 will be stopped at a lower position. Considering the effect of raising the upper stop position of the switch arm 26, it will be noted that upward movement of the switch actuating arm 27 must be increased in order to cause the switch mechanism 22 to snap to its open position. The increased upward movement of the switch arm 27 can result only from a greater counterclockwise movement of the operating lever 36, such as would be produced by a lower pressure temperature condition in the bellows 37. In other words, raising the stationary contact 24 requires the controller to sense a lower temperature than was previously required to cause the switch mechanism 22 to snap from its closed to its open position, i. e., cut-out. Similarly, lowering the stationary contact 24 raises the cut-out temperature for the controller.

Raising and lowering the stationary contact 24 is effected by the user of the controller by rotating cam 71. Referring to Fig. 5, movement of the cam 71 is transferred by its cam face 72 to the leaf spring 62 and through the pin 66 to the cantilever mounting spring 29 which supports the stationary contact 24. With the cam arrangement illustrated, the contact 24 is lowered by rotating the cam 71 clockwise (when the controller is viewed from above), and the contact 24 is raised by a counterclockwise movement of the cam 71. In this manner, the user of the control is able to adjust the cut-out temperature of the controller.

The cut-in temperature of the controller is determined by the position of the set screw 33, which acts as a stop in the path of downward movement of the contact carrying arm 26. This screw 33 is adjusted prior to installation of the controller and is not intended to be readily adjustable by the user. The cut-in temperature for the controller therefore remains constant. Since the cut-in temperature is constant and the cut-out temperature is adjustable, in effect, the user adjustment described above changes the differential of the controller, i. e., the difference between the cut-in and cut-out temperatures. The average temperature to which the controller responds is, of course, varied directly as the cut-out temperature is varied.

It will be apparent from the foregoing that this invention provides an improved circuit controller which is inexpensive and easy to manufacture and is suitable for refrigeration applications or the like wherein it is desirable to close an electrical circuit in response to a fixed predetermined higher temperature or pressure condition and to open an electrical circuit in response to a lower pressure or temperature condition which may be selected by the user.

While the invention has been shown in but one form, it will be obvious to those skilled in the art that it is not so limited, but is susceptible of various other changes and modifications without departing from the spirit thereof.

What is claimed is:

1. The combination with a circuit controller comprising a casing having an opening in one wall thereof, a switch mechanism, a condition responsive device, and means for transmitting movement of said condition responsive device to said switch mechanism, all of the aforementioned components being disposed within said casing, of means for varying the operating characteristics of said controller, said means comprising a member having a cam surface on one face thereof, said member being mounted on said one wall of said controller casing with the cam face thereof in face-to-face contact with the outer surface of said wall and covering the said opening in said wall, and a member disposed within said casing and having a portion thereof extending through the said opening in said wall and being adapted to engage the said cam surface of the rotatable member.

2. The combination with a pressure responsive circuit controller having a casing, a switch mechanism carried by said casing and movable between first and second positions, and means including a pressure responsive device for moving said switch mechanism from its first position to its second position, of means for varying the amount of change in pressure in said pressure responsive device required to move said switch mechanism from its first position to its second position, said last named means including a generally flat spring member mounted on the inner surface of one wall of said casing and extending substantially parallel to said wall, said spring member having a portion projecting therefrom and through an opening provided therefor in said one wall, and a rotatable member mounted on the outer surface of said one wall and having a cam surface thereon, said rotatable member being disposed in face-to-face contact with the outer surface of said one wall to cover said opening and in a position whereby the cam surface thereon engages the said projecting portion of said spring member.

3. In a condition responsive controller having a switch mechanism including a stationary contact disposed within a casing, means for adjusting the position of said stationary contact to vary the differential of said controller and comprising a generally flat spring member mounted on the inner surface of one wall of said casing and extending substantially parallel to said wall, said spring member having a portion projecting therefrom and through an opening provided therefor in said one wall, a rotatable member mounted on the outer surface of said one wall and having a cam surface thereon, said rotatable member being disposed in face-to-face contact with the outer surface of said one wall to cover said opening and in a position whereby the cam surface thereon engages the said projecting portion of said spring member, and means for transmitting movement of said spring member to said contact.

4. The combination with a circuit controller comprising a casing having an opening in one wall thereof, a switch mechanism, a condition responsive device, and means for transmitting movement of said said condition responsive device to said switch mechanism, all of the aforementioned components being disposed within said casing, of means for varying the operating characteristics of said controller, said means comprising a member having a cam surface on one face thereof, said member being mounted on said one wall of said controller casing with the cam face thereof in face-to-face contact with the outer surface of said wall and covering the said opening in said wall, and a member mounted on the inner surface of said one wall and having a portion thereof extending through the said opening in said wall and being adapted to engage the said cam surface of the rotatable member.

5. In a controller, the combination of a housing having an opening in one wall thereof, a cover for said opening, a switch mechanism mounted within said housing and having an electrical contact, a cantilever spring mounted on said housing for movably supporting said contact, a leaf spring mounted on said cover, a rigid member adapted to be received between said springs, the construction and arrangement of said springs being such as to maintain said member under compression, and means carried by said cover for deflecting said leaf spring and to thereby change the position of said contact.

6. In a circuit controller, a housing having an opening therein, a cover for said opening, a condition responsive device and a switch mechanism disposed within said housing, an operating lever pivotally mounted in said housing for transmitting movement of said condition responsive device to said switch mechanism, means for holding said operating lever in a fixed position regardless of the condition of said condition responsive device, said last named means including a member having a portion thereof projecting through an opening provided therefor in said cover, means for varying the differential of the controller, said differential varying means including a member having a portion thereof projecting through an opening provided therefor in said cover, and a rotatable member mounted on said cover adjacent the exterior surface thereof, said rotatable member having two cam surfaces for engaging respectively the projecting portions of the operating lever holding means and said differential varying means.

References Cited in the file of this patent

UNITED STATES PATENTS

| | | |
|---|---|---|
| 2,671,839 | Cox | Mar. 9, 1954 |
| 2,724,030 | Hilgert | Nov. 15, 1955 |